United States Patent
Sloane et al.

(10) Patent No.: US 7,703,434 B2
(45) Date of Patent: Apr. 27, 2010

(54) METHOD AND APPARATUS FOR CONTROLLING IGNITION TIMING IN A COMPRESSION-IGNITION ENGINE OPERATING IN AN AUTO-IGNITION MODE

(75) Inventors: Thompson M. Sloane, Oxford, MI (US); Norman D. Brinkman, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 379 days.

(21) Appl. No.: 11/758,025

(22) Filed: Jun. 5, 2007

(65) Prior Publication Data

US 2008/0302329 A1    Dec. 11, 2008

(51) Int. Cl.
F02B 23/00    (2006.01)
(52) U.S. Cl. .................................................. 123/299
(58) Field of Classification Search ............... 123/299, 123/300, 305, 294
See application file for complete search history.

(56) References Cited

U.S. PATENT DOCUMENTS

| | | | |
|---|---|---|---|
| 6,532,736 B2 | 3/2003 | Hammerle et al. | |
| 6,708,484 B2 | 3/2004 | Onodera et al. | |
| 6,792,751 B2 | 9/2004 | Kokusyo et al. | |
| 7,082,753 B2 | 8/2006 | Dalla Betta et al. | |
| 7,128,047 B2 * | 10/2006 | Kuo et al. .................... | 123/299 |
| 7,194,996 B2 * | 3/2007 | Koopmans .................... | 123/295 |
| 7,284,531 B2 * | 10/2007 | Brachert et al. .............. | 123/295 |
| 7,360,523 B2 * | 4/2008 | Sloane et al. ................ | 123/305 |
| 2002/0054844 A1 | 5/2002 | Pfeifer et al. | |
| 2004/0083722 A1 | 5/2004 | Simpson et al. | |
| 2005/0188955 A1 * | 9/2005 | Koopmans .................... | 123/435 |
| 2006/0005804 A1 * | 1/2006 | Kuo et al. .................... | 123/295 |
| 2006/0201468 A1 | 9/2006 | Lancaster et al. | |
| 2007/0215095 A1 * | 9/2007 | Kakuya et al. ............... | 123/295 |
| 2008/0066713 A1 * | 3/2008 | Megli et al. .................. | 123/295 |

OTHER PUBLICATIONS

Kass,M; Selective Catalytic Reduction of Diesel NOx Emissions using Ethanol as a Reductant; USDOE 9th DEER Conf; Aug. 2003; Newport, RI USA.
Twigg,M;Automotive Exhaust Emissions Control; Platinum Metals Rev;2003,47,(4),157-162.

(Continued)

Primary Examiner—Stephen K Cronin
Assistant Examiner—Arnold Castro

(57) ABSTRACT

A method for controlling timing of ignition of a fuel charge in a compression-ignition engine operating in a controlled auto-ignition mode wherein the engine includes controllable intake and exhaust valve actuation systems is described. The method comprises determining a preferred ignition timing for a cylinder charge and a mass of the fuel charge based upon operator torque request. A portion of the fuel charge is partially oxidized during a negative valve overlap period immediately prior to a compression stroke. Magnitude of the portion of the fuel charge is based upon the preferred ignition timing of the cylinder charge. A remainder of the fuel charge is injected into the cylinder during the compression stroke.

19 Claims, 3 Drawing Sheets

OTHER PUBLICATIONS

Lee,JH; HC Reaction pathway in Selective NO Reduction over a BiFunctional $SnO_2/Al_2O_3$ Catalyst; Chem Commun. 2001;1404-1405; Royal Soc. of Chem; UK.

Jacobs,TJ; Lean & Rich Premixed Compression Ignition Combustion in a Light-Duty Diesel Engine; SAE 2005-01-0166; 2005; SAE Warrendale, PA USA.

Shi, L; Study of Diesel-fuelled Homogeneous Charge CI Combustion by in-cylinder early fuel injection and NVO; Proc. IMechE vol. 219 Part D; pp. 1193-1201; J Auto Engrg; 2005.

Ma,Qing-jan; HCCI Combustion Based on Gasoline Split Direct Injection with Negative Valve Overlap Journal of Combustion Science and Technology; Apr. 2006, pp. 110-114; vol. 12 No. 2; China Academic Journal Electronic Publishing House; China.

* cited by examiner

METHOD AND APPARATUS FOR CONTROLLING IGNITION TIMING IN A COMPRESSION-IGNITION ENGINE OPERATING IN AN AUTO-IGNITION MODE

TECHNICAL FIELD

This invention relates to operation and control of compression-ignition engines operative in an auto-ignition mode.

BACKGROUND OF THE INVENTION

The statements in this section merely provide background information related to the present disclosure and may not constitute prior art.

Compression-ignition engines, e.g., diesel engines, offer benefits including improved fuel economy. Manufacturers of vehicles, including passenger cars, commercial trucks, construction, and agricultural tractors, must meet stringent emissions requirements to market their products.

Controlling ignition timing, i.e., retarding or advancing timing, on a diesel engine is a valuable control option, in order to achieve low smoke emissions. For example, it has been demonstrated that in a system operating in lean air/fuel ratio in a compression-ignition mode with a premixed cylinder charge (i.e., controlled auto-ignition or homogeneous-charge compression-ignition, or HCCI), it is necessary to complete the injection of all fuel before ignition occurs, in order to achieve benefits related to lowered particulate matter (PM) emissions.

In an engine operating in auto-ignition mode, combustion of a cylinder charge is flameless, and spontaneously occurs throughout the entire combustion chamber volume. The homogeneously mixed cylinder charge auto-ignites as the cylinder charge is compressed and its temperature increases. The ignition timing of auto-ignited combustion depends on initial cylinder charge conditions including, primarily, temperature, pressure, and composition of the cylinder charge. Thus, it is important to coordinate engine control inputs, such as fuel mass, injection timing, and intake and exhaust valve motion, to ensure robust auto-ignition combustion.

Timing of fuel injection is currently used to control ignition and combustion timing in diesel engines. Injection timing during the main compression stroke is the main alternative control option for controlling ignition timing in diesel engines. By retarding timing of injection, ignition of the cylinder charge is retarded. However, it is necessary to complete the injection of all fuel before ignition occurs.

It is well known that techniques for achieving low NOx emissions and particulates associated with diesel auto-ignition combustion are limited to moderate loads, because ignition of the cylinder charge is too rapid at high loads. It would be useful to have a method for retarding ignition timing that is not related to injection timing. It would be useful to expand the operating range of a compression-ignition engine in auto-ignition mode to improve emissions performance and fuel economy.

It is well known from studies of gasoline HCCI engines with negative valve overlap (NVO) that fuel injected during the negative valve overlap (recompression) advances combustion timing. The reason given for this is that the fuel injected during negative valve overlap is partially oxidized, or reformed, releasing some heat so that the temperature of the trapped residual is increased. The presence of higher trapped residuals results in a higher temperature at intake valve closing, leading to earlier ignition in a gasoline engine operating in HCCI mode.

At moderate and high loads in a premixed diesel engine, the ignition delay is decreased due to high in-cylinder temperature. As a result, combustion timing is over-advanced, resulting in excessive engine noise and possibly higher soot emissions. Premixed diesel combustion relies heavily on recirculated exhaust gas (EGR) to retard combustion. During transient operation of premixed diesel combustion, a delay in EGR reaching the cylinder can result in unstable ignition timing. At high load, engine noise becomes a problem because sufficient EGR cannot be inducted into the combustion chamber.

There is a need to control ignition timing independently of injection timing in a compression-ignition engine operating in an auto-ignition mode. The benefits of so operating include expanding the dynamic operating range of the engine in the auto-ignition mode, improving emissions performance and fuel economy, and, minimizing engine noise.

SUMMARY OF THE INVENTION

In accordance with an embodiment of the invention, there is provided a method and system for controlling timing of ignition of a cylinder charge in a compression-ignition engine including controllable intake and exhaust valve actuation systems that is operating in a controlled auto-ignition mode. The method comprises determining a preferred ignition timing for the cylinder charge and a fuel charge mass for direct injection to the cylinder based upon operator torque request. A portion of the fuel charge is partially oxidized by injection into the cylinder during a negative valve overlap period immediately prior to a compression stroke. Magnitude of the portion of the fuel charge is based upon the preferred ignition timing of the cylinder charge. A remainder of the fuel charge is injected into the cylinder during the compression stroke. These and other aspects of the invention are described hereinafter with reference to the drawings and the description of the embodiments.

DESCRIPTION OF THE DRAWINGS

The invention may take physical form in certain parts and arrangement of parts, the embodiments of which are described in detail and illustrated in the accompanying drawings which form a part hereof, and wherein.

DETAILED DESCRIPTION OF THE INVENTION

Figure 1:
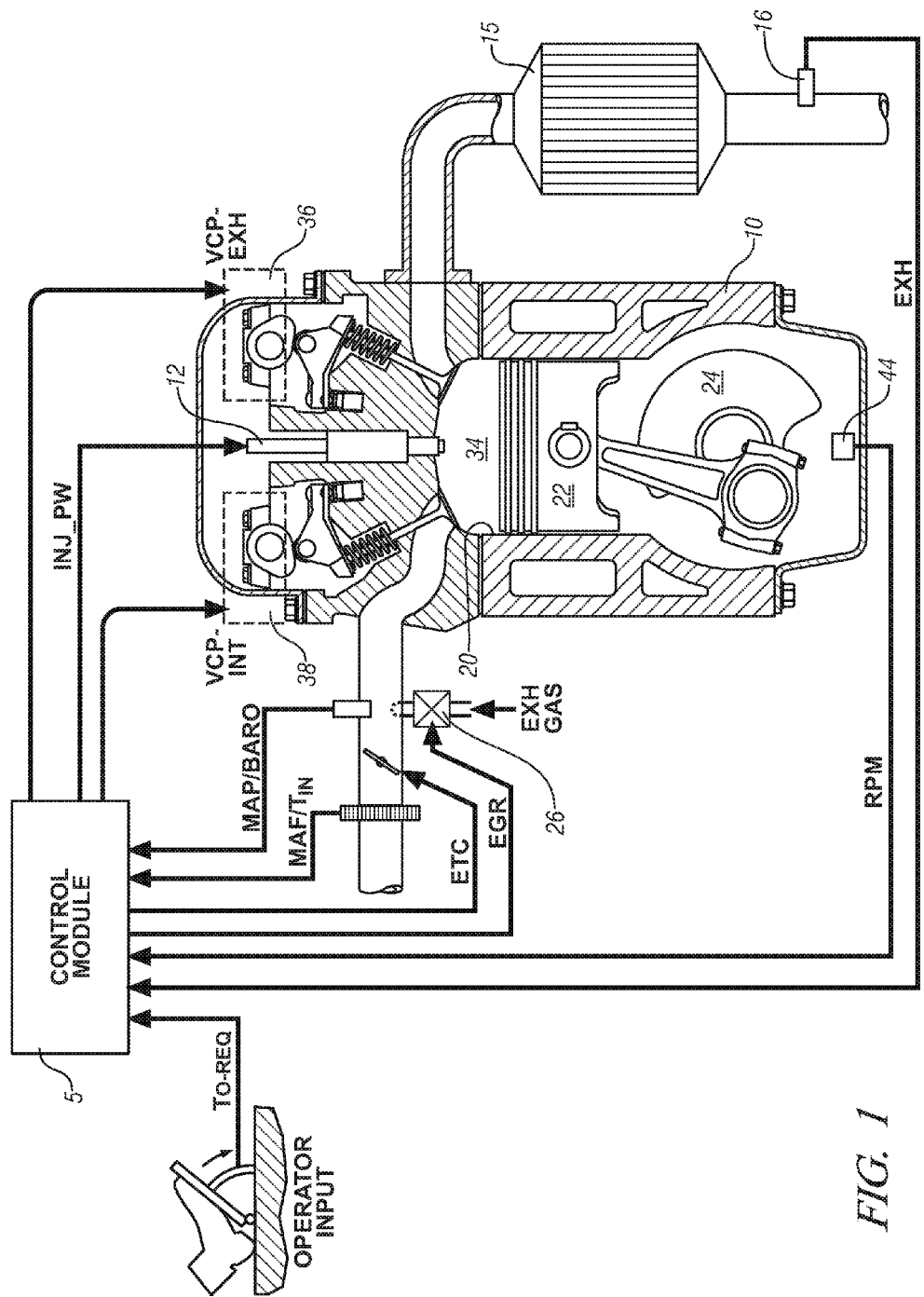
FIG. 1 is a schematic drawing of an engine, in accordance with the present invention.

Referring now to the drawings, wherein the depictions are for the purpose of illustrating the invention only and not for the purpose of limiting the same, FIG. 1 comprises a schematic diagram depicting an internal combustion engine 10, exhaust aftertreatment system 15, and control module 5, constructed in accordance with an embodiment of the present invention.

The exemplary engine 10 comprises a multi-cylinder, direct-injection, compression-ignition, internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request ('To_REQ'). The engine preferably employs a four-stroke operation wherein each engine combustion cycle comprises 720 degrees of angular rotation of crankshaft 24 divided into four 180-degree stages of intake-compression-expansion-exhaust, which are descriptive of reciprocating movement of the piston 22 in the engine cylinder 20.

The engine preferably has an air/fuel operating regime that is primarily lean of stoichiometry. The skilled practitioner understands that aspects of the invention are applicable to other engine configurations that operate primarily lean of stoichiometry, e.g., lean-burn spark-ignition engines. During normal compression-ignition operation of the compression-ignition engine, a combustion event occurs during each engine cycle when a fuel charge is injected into the combustion chamber to form, with the intake air, the cylinder charge. The cylinder charge is subsequently combusted by action of compression thereof during the compression stroke. During the normal compression-ignition operation, the fuel charge is injected during the compression stroke. In-cylinder burned gases are generated due to incomplete combustion of the fuel and air mixture, which become exhaust gases when passed out of the combustion chamber with opening of the engine exhaust valves during the exhaust stroke, which occurs after the expansion stroke. The exhaust gas is made up of regulated constituent elements preferably transformed by the aftertreatment system to inert gases, typically including hydrocarbons ('HC'), carbon monoxide ('CO'), nitrogen oxides ('$NO_x$'), and particulate matter ('PM'), among others. The engine includes sensing devices to monitor engine operation, and actuators which control engine operation. The sensing devices and actuators are signally or operatively connected to control module 5.

Sensing devices are installed on or near the engine 10 to monitor physical characteristics and generate signals which are correlatable to engine and ambient parameters. The sensing devices preferably comprise a crank sensor 44 for monitoring crankshaft speed (RPM), a manifold pressure sensor for monitoring manifold pressure (MAP) and ambient barometric pressure (BARO), a mass air flow sensor for monitoring intake mass air flow (MAF) and intake air temperature ($T_{IN}$), and, an exhaust gas sensor 16 for monitoring states of one or more exhaust gas parameters, e.g., temperature, air/fuel ratio, and constituents (EXH). One skilled in the art understands that there may be one or more sensing devices and methods for monitoring exhaust gas before, in the middle of, and after the exhaust aftertreatment system for purposes of control and diagnostics. The operator input, in the form of the operator torque request (To_REQ) is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms and still fall within the scope of the invention.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request (To_REQ). There is an exhaust gas recirculation valve 26 and cooler (not shown), which controls flow of externally recirculated exhaust gas to the engine intake, in response to a control signal (EGR) from the control module.

The fuel injector 12 is an element of a fuel injection system, which comprises a plurality of high-pressure fuel injector devices each adapted to directly inject a fuel charge, comprising a mass of fuel, into one of the combustion chambers in response to the command signal, INJ_PW, from the control module. Each of the fuel injectors 12 are supplied pressurized fuel from a fuel distribution system (not shown), and have operating characteristics including a minimum pulsewidth and an associated minimum controllable fuel flow rate, and a maximum fuel flowrate. The minimum controllable fuel flow rate determines a lower limit for controllable fuel injection, including during a fuel reforming period that occurs during a negative valve overlap period, and, during a main injection event.

The engine 10 is equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. As depicted in FIG. 1, each cylinder includes an intake valve and an exhaust valve, the opening and closing of which are controlled by camshafts which are rotatably connected to the crankshaft. There is an intake air control device 38, comprising a variable cam phaser ('VCP') which adjusts phasing of the opening and closing of the intake valve relative to the crankshaft rotation. The intake air control device 38 is preferably further mechanized to control valve lift of each intake valve, referred to as variable lift control ('VLC'). The variable lift system is operative to control lift of the intake valve to one of two or more distinct steps. The intake VCP/VLC system 38 controls phasing, opening and closing times, and valve lift of the intake valve, in response to a control signal (VCP-INT) from the control module. There is an exhaust air control device 36, comprising a variable cam phaser ('VCP') which adjusts phasing of the opening and closing of the exhaust valve relative to the crankshaft rotation. The exhaust air control device 36 is preferably further mechanized to control valve lift of each exhaust valve, again referred to as variable lift control ('VLC'). The variable lift system is operative to control lift of the exhaust valve to one of two or more distinct steps. The exhaust VCP/VLC system 36 controls phasing, opening and closing times, and valve lift of the exhaust valve, in response to a control signal (VCP-EXH) from the control module. The control module is operative to control phasings of openings and closings of the intake and exhaust valves to create the NVO period. This preferably includes executing control to simultaneously advance the closing of the exhaust valves and retard the opening of the intake valve by substantially equal degrees of rotation, i.e., balancing the phasings of the intake and exhaust valves. Similarly, the closing of the exhaust valves may be advanced and the openings of the intake valves may be retarded in a balanced manner.

The intake and exhaust air control devices may be actuated using one of electro-hydraulic, hydraulic, and electric control force. Other engine system components (not shown) may include an intake air compressing device, e.g., a variable geometry turbine device and air compressor, a charge air cooler, among others.

The engine operates un-throttled using diesel fuel or similar fuel blends in the auto-ignition combustion mode over a range of engine speeds and loads which are typically determined during engine development and precalibrated into the control module. Conventional compression-ignition combustion is utilized at operating speed/load conditions which are not conducive to operation in the auto-ignition combustion mode, and to obtain maximum engine power to meet the operator torque request.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, intake and/or exhaust valve timing, phasing, and lift, and EGR valve position to control flow of recirculated exhaust gases. The control module is adapted to receive input signals from the operator (e.g., a throttle pedal position and a brake pedal position) to determine the operator torque request ($T_{O\_REQ}$) and from the sensors indicating the engine speed (RPM) and intake air temperature ($T_{IN}$), and coolant temperature and other ambient conditions. The control module 5 determines, from lookup tables in memory, instantaneous control settings for EGR valve position, intake and exhaust valve timing and/or lift set points, and fuel injection mass and timing The invention comprises a method and control scheme for controlling timing of ignition of the cylinder charge in the exemplary compression-ignition engine described above, operating in auto-ignition mode, thus increasing the dynamic speed/load operating range of the engine in the auto-ignition mode, with accompanying benefits accruing thereto.

The method comprises controlling timing of ignition of the cylinder charge while operating the engine in the controlled auto-ignition mode, including splitting injection of the fuel charge into two or more injection events during an engine cycle. The engine control includes exhaust recompression, wherein timing and phasing of the intake and exhaust valves are controlled to achieve the negative valve overlap ('NVO') period during which partial oxidation of fuel injected during this NVO period can take place. This partial oxidation is also sometimes referred to as fuel reforming. A preferred ignition timing for the cylinder charge and a total mass of the fuel charge for direct injection to the cylinder to meet the operator torque request are determined by the control module, based upon known calibrations and engine operating characteristics. A first portion of the fuel charge is injected during the NVO period immediately prior to the compression stroke, during ongoing engine operation. Mass of the first portion of the fuel charge is based upon the preferred ignition timing of the cylinder charge. A remaining portion of the fuel charge is injected into the cylinder during the subsequent compression stroke. The mass of the first portion of the injected fuel charge is determined based upon the minimum controllable fuel flow rate of the injector. This mass is either zero percent of the fuel charge, or can range between the minimum controllable fuel flow rate of the injector and approximately fifty percent of the fuel charge. The remainder of the total mass of fuel is injected during the subsequent compression stroke in accordance with the auto-ignition combustion process.

Figure 2:
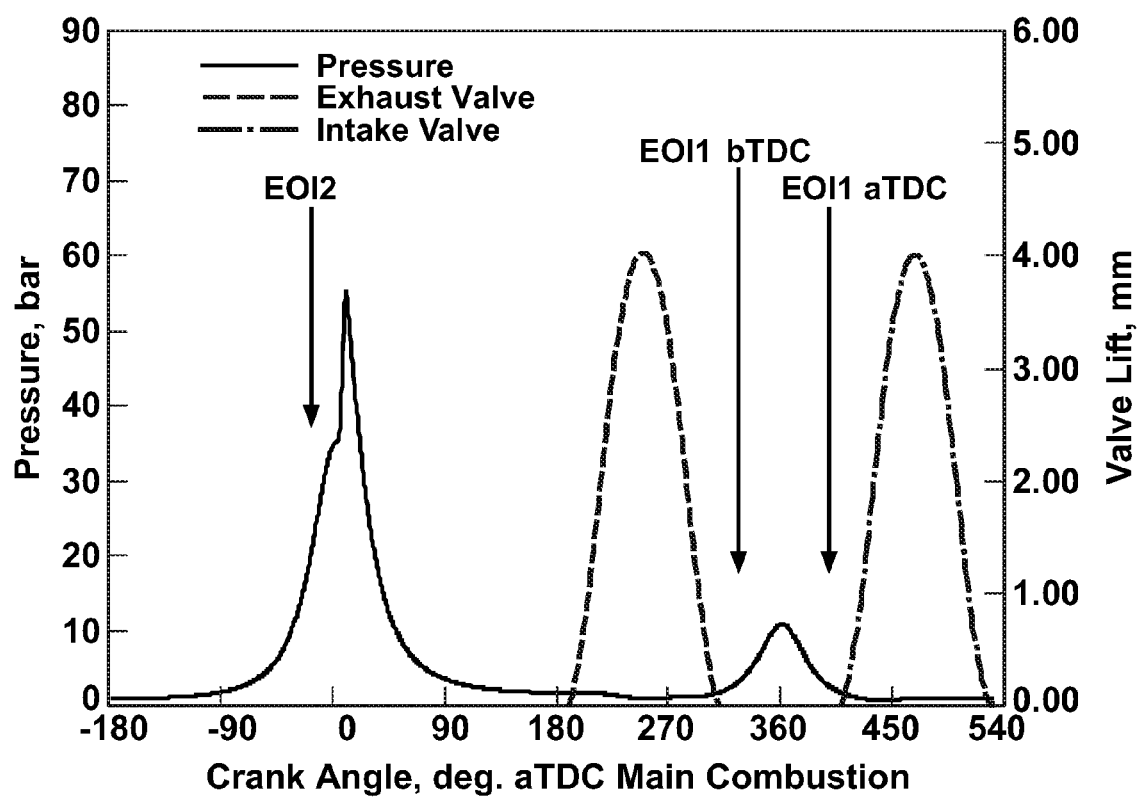
FIG. 2 is a data graph, in accordance with the present invention.

Referring now to FIG. 2, and Table 1, below, results of simulated engine operation are described for the engine operated as described to control ignition timing by reforming fuel during the NVO period. The concept of the method is based upon a change in composition of trapped residual gas in the combustion chamber when the fuel injected during the NVO period, due to partial oxidation of the fuel. With diesel fuel, the reforming fuel produces a composition that is more difficult to ignite than diesel fuel itself. The simulated engine operation comprised full-cycle engine modeling calculations performed with n-heptane, a diesel fuel surrogate, wherein 1.05 milligrams (mg) of fuel were injected before top dead center (TDC) of the NVO period and 13.95 mg fuel were injected during the compression stroke shortly before TDC of the main combustion stroke. The results demonstrate that some of the n-heptane injected before TDC during the NVO period was partially oxidized, or reformed, to form molecules such as methane, ethene, ethane, propene, 1-pentene, carbon monoxide, and heptene. The molecules were trapped in the combustion chamber, and were mixed with intake air during the subsequent intake stroke, to produce a mixture of these molecules with n-heptane and air at intake valve closing. The molecules, both separately and when combined together, are more difficult to auto-ignite than n-heptane itself. The mixture of n-heptane and the molecules resulted in a retarded ignition timing compared to the case where 1.05 mg n-heptane was injected after TDC of the NVO period and 13.95 mg fuel was injected with the same injection timing shortly before TDC of the main combustion stroke. In the latter case little or no partial oxidation of the injected n-heptane occurred. Diesel fuel typically behaves similarly to n-heptane, because diesel fuel contains many long, straight-chain hydrocarbons that have very similar combustion characteristics to n-heptane. As a result of this similar structure to many components of diesel fuel, n-heptane has a high cetane number, similar to commonly-used diesel fuels. The simulation results are depicted with reference to FIG. 2 and detailed in Table 1. The single injection event has an end of fuel injection (EOI2) occurring at 20 crank angle degrees before TDC; the dual injection event without fuel reforming has a first injection event of 1.05 mg fuel and an end of the first fuel injection (EOI1) occurring at 405.7 crank angle degrees after the previous TDC-compression, i.e., after TDC-intake and an end of second fuel injection (EOI2) occurring at 20 crank angle degrees before TDC; and, the dual injection event with fuel reforming has a first injection event of 1.05 mg fuel and an end of the first fuel injection (EOI1) occurring at 310.7 crank angle degrees after the previous TDC-compression, i.e., before TDC-intake and an end of second fuel injection (EOI2) occurring at 20 crank angle degrees before TDC.

TABLE 1

| Parameter | Single Injection | No Reforming | Reforming |
|---|---|---|---|
| Injected fuel, mg |  | 15 | 15 |
| Injection duration, CA deg. | 10 | 10 | 10 |
| EOI1, aTDC combustion | — | 405.7 | 310.7 |
| EOI2, aTDC | −20 | −20 | −20 |
| Injection amount 1, mg | 0 | 1.05 | 1.05 |
| Injection amount 2, mg | 15 | 13.95 | 13.95 |
| NMEP, bar | 3.46 | 3.44 | 3.46 |
| CA10, deg. aTDC | 0.9 | −0.35 | 3.8 |
| CA50, deg. aTDC | 3.0 | 1.9 | 6.4 |
| Noise, MW/m$^2$ | 4.1 | 3.4 | 3.5 |
| T @ IVC, K | 426 | 424 | 431 |

As described and depicted with reference to FIG. 2 and Table 1, at the conditions of the calculations the heat released during the partial oxidation of the n-heptane during the NVO period results in a higher temperature at intake valve closing, but a retarded combustion phasing compared to the absence of this partial oxidation. A higher temperature at intake valve closing tends to advance the auto-ignition timing. The partial oxidation products of the fuel, however, tend to retard the auto-ignition timing. This means that there is a competition between the temperature effect and the composition effect. Under some conditions one of these may dominate, and at other conditions the other may dominate. Referring to FIG. 3, the composition effect dominates for amounts of fuel, injected before TDC of the NVO period, ranging from about 1 mg to 4 mg, with the remainder of the 15 mg fuel charge injected during the compression stroke.

Engine load and speed conditions under which the control module preferably executes the control scheme described herein comprise a load range from approximately 200 to 700 kPa brake-mean-effective-pressure (BMEP) and from approximately 1000 to 4000 RPM.

Figure 3A:
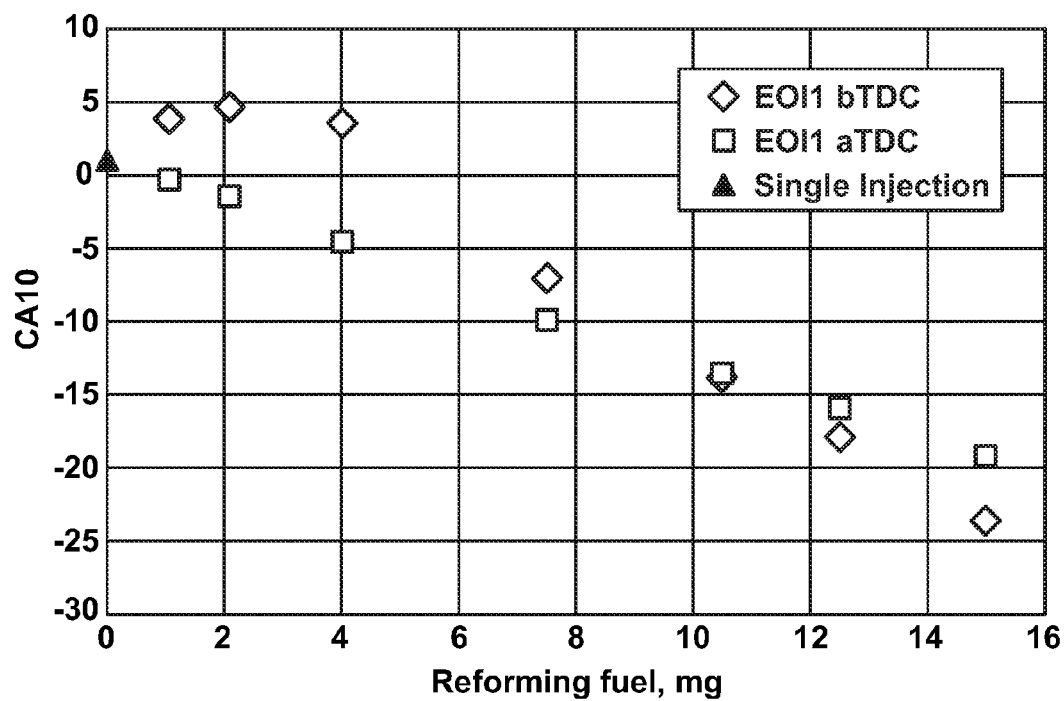
FIGS. 3A and 3B are data graphs, in accordance with the present invention.
Figure 3B:
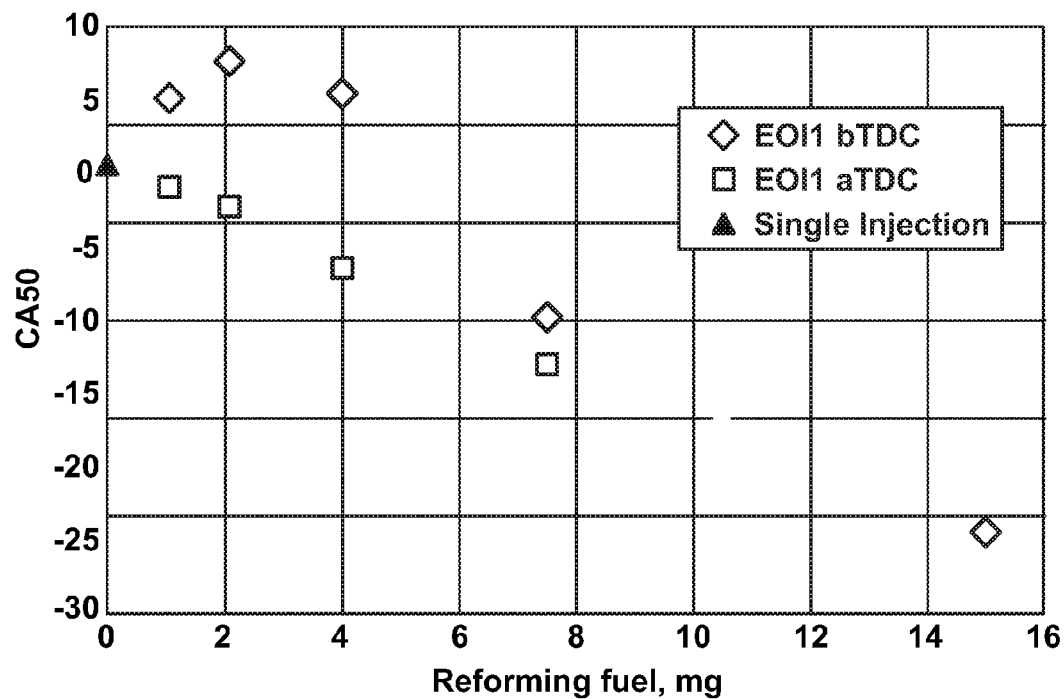

Referring now to FIG. 3, results of the simulated engine operation are depicted for the engine operated as described to control ignition timing by reforming fuel during NVO, with varying amounts of reforming fuel. The results in FIG. 3A depict calculated CA10, i.e., a crank angle location at which 10% of the fuel mass is burned as a function of the mass of reforming fuel (mg), for single injection operation, dual injection operation with the end of injection (EOI) occurring before TDC, and dual injection operation with the end of injection (EOI) occurring after TDC. The results in FIG. 3B depict calculated CA50, i.e., a crank angle location at which 50% of the fuel mass is burned as a function of the mass of reforming fuel (mg), for single injection operation, dual injection operation with the end of injection (EOI) occurring before TDC, and dual injection operation with the end of injection (EOI) occurring after TDC. In each case of dual injection, the remaining fuel was injected such that the end of injection occurred 20 crank angle degrees bTDC of the subsequent injection. These results demonstrate that ignition of the cylinder charge is retarded with the dual injection operation having the end of injection (EOI) occurring before TDC of the NVO period. Thus, injecting some of the fuel during the NVO period retards the ignition timing, and reduces the engine noise, allowing an expansion of the controlled auto-ignition operating range to higher load conditions.

While the invention has been described by reference to certain preferred embodiments, it should be understood that changes can be made within the spirit and scope of the inventive concepts described. Accordingly, it is intended that the invention not be limited to the disclosed embodiments, but that it have the full scope permitted by the language of the following claims.

The invention claimed is:

1. Method for controlling timing of ignition of a cylinder charge in a compression-ignition engine operating in a controlled auto-ignition mode, the compression-ignition engine including controllable intake and exhaust valve actuation systems, the method comprising:
   determining a fuel charge for injecting diesel fuel into the cylinder to create a cylinder charge based upon an operator torque request;
   determining a preferred ignition timing for the cylinder charge;
   partially oxidizing a portion of the fuel charge in the cylinder, wherein mass of the partially oxidized portion of the fuel charge is based upon the preferred ignition timing of the cylinder charge; and,
   injecting a remainder of the fuel charge into the cylinder during an immediately subsequent compression stroke.

2. The method of claim 1, wherein partially oxidizing the portion of the fuel charge in the cylinder comprises injecting the portion of the fuel charge into the cylinder during a negative valve overlap period immediately prior to the compression stroke.

3. The method of claim 2, further comprising injecting the portion of the fuel charge into the cylinder during the negative valve overlap period such that an end of the injecting occurs prior to a top-dead-center of piston travel during the negative valve overlap period.

4. The method of claim 3, further comprising the end of the injecting occurring twenty degrees prior to a top-dead-center of piston travel during the negative valve overlap period.

5. The method of claim 2, wherein the negative valve overlap period comprises: adjusting openings and closings of intake and exhaust valves to create a negative valve overlap period between a closing of the exhaust valve and an opening of the intake valve for the cylinder.

6. The method of claim 2, further comprising: increasing the portion of the fuel charge injected during the negative valve overlap period to increasingly retard the ignition timing.

7. Method for retarding ignition timing in a compression-ignition engine operating in a controlled auto-ignition mode, the compression-ignition engine including controllable intake and exhaust valve actuation systems, the method comprising:
   determining a fuel charge for direct injection of diesel fuel into a cylinder to meet an operator torque request;
   adjusting openings and closings of the intake and exhaust valves to create a negative valve overlap period between closing of the exhaust valve and opening of the intake valve for the cylinder;
   injecting a portion of the fuel charge into the cylinder during the negative valve overlap period wherein an end of the injecting occurs prior to a top-dead-center point of piston travel; and,
   injecting a remainder of the fuel charge into the cylinder during an immediately subsequent compression stroke.

8. The method of claim 7, wherein adjusting opening and closing of the intake and exhaust valves to create a negative valve overlap period between closing of the exhaust valve and opening of the intake valve for the cylinder comprises adjusting phasings of exhaust and intake camshafts operative to actuate the exhaust valve and the intake valve.

9. The method of claim 8, wherein adjusting opening and closing of the intake and exhaust valves to create a negative valve overlap period between closing of the exhaust valve and opening of the intake valve for the cylinder further comprises controlling magnitude of lift of the exhaust valve and the intake valve when the valves are open.

10. The method of claim 8, wherein adjusting openings and closings of the intake and exhaust valves to create the negative valve overlap period comprises adjusting the intake and exhaust valve actuation systems to advance closing time of the exhaust valve and retard opening time of the intake valve by substantially equal amounts.

11. The method of claim 8, wherein injecting the portion of the fuel charge into the cylinder during the negative valve overlap period further comprises controlling the portion of the fuel charge based upon a preferred ignition timing of the cylinder.

12. The method of claim 11, further comprising: increasing the portion of fuel injected during the negative valve overlap period to increasingly retard the ignition timing.

13. The method of claim 7, wherein injecting the portion of the fuel charge into each combustion chamber during the negative valve overlap period further comprises starting the injecting of the portion of the fuel charge before top dead center of the negative valve overlap period.

14. The method of claim 13, further comprising injecting the portion of the fuel charge into the cylinder during the negative valve overlap period such that an end of the injecting occurs prior to the top-dead-center of piston travel.

15. The method of claim 14, further comprising the end of the injecting occurring twenty degrees prior to the top-dead-center of piston travel.

16. Article of manufacture, comprising a storage medium containing a machine-executable program operative to control timing of ignition of a cylinder charge in a compression-ignition engine selectively operating in a controlled auto-ignition mode, the compression-ignition engine including controllable intake and exhaust valve actuation systems, the program comprising:
 code to determine a total mass of a diesel fuel charge for direct injection to the cylinder to create a cylinder charge based upon operator torque request;
 code to determine a preferred ignition timing for the cylinder charge;
 code to adjust openings and closings of the intake and exhaust valves to create a negative valve overlap period between closing of the exhaust valve and opening of the intake valve for the cylinder;
 code to control fuel injection to inject a portion of the diesel fuel charge into the cylinder during the negative valve overlap period wherein an end of the injecting occurs prior to a top-dead-center point of piston travel; and,
 code to control fuel injection to inject a remainder of the diesel fuel charge into the cylinder during an immediately subsequent compression stroke.

17. The article of manufacture of claim 16, wherein the code to control fuel injection to inject a portion of the diesel fuel charge into the cylinder during the negative valve overlap period further comprises: code to control the portion of diesel fuel injected during the negative valve overlap period based upon the preferred ignition timing for the cylinder charge.

18. The article of manufacture of claim 17, wherein the code to control the portion of diesel fuel injected during the negative valve overlap period based upon the preferred ignition timing for the cylinder charge comprises code to increase the injected portion of the diesel fuel charge into the cylinder during the negative valve overlap period to increasingly retard the ignition timing.

19. The article of manufacture of claim 18, wherein the portion of diesel fuel injected during the negative valve overlap period ranges between a minimum controllable amount and approximately fifty percent of the diesel fuel charge.

* * * * *